United States Patent [19]

Jayawant

[11] Patent Number: 4,579,725

[45] Date of Patent: Apr. 1, 1986

[54] POTASSIUM MONOPERSULFATE COMPOSITIONS AND PROCESS FOR PREPARING THEM

[75] Inventor: Madhusudan D. Jayawant, Hockessin, Del.

[73] Assignee: E. I. Du Pont de Nemours and Company, Wilmington, Del.

[21] Appl. No.: 771,490

[22] Filed: Sep. 4, 1985

Related U.S. Application Data

[63] Continuation of Ser. No. 567,007, Dec. 30, 1983, abandoned.

[51] Int. Cl.$^4$ .................. C01B 15/06; C01B 15/08
[52] U.S. Cl. .................................................. 423/513
[58] Field of Search .......................................... 423/513

[56] References Cited

U.S. PATENT DOCUMENTS

| 2,901,318 | 8/1959 | D'Addieco et al. | 423/513 |
| 2,901,319 | 8/1959 | D'Addieco | 423/513 |
| 3,036,885 | 5/1962 | Muller et al. | 423/513 |
| 3,041,139 | 5/1962 | D'Addieco | 423/513 |

FOREIGN PATENT DOCUMENTS

| 166124 | 12/1953 | Australia | 423/513 |
| 575441 | 5/1959 | Canada | 423/513 |
| 46-38406 | 12/1971 | Japan | 423/513 |
| 46-38405 | 12/1971 | Japan | 423/513 |
| 974450 | 1/1965 | United Kingdom | 423/513 |
| 361135 | 2/1973 | U.S.S.R. | 423/513 |

*Primary Examiner*—Gary P. Straub

[57] ABSTRACT

A storage stable salt melting at 80° to 150° C. having the formula $(KHSO_5)_x(KHSO_4)_y(K_2SO_4)_z$ where $x+y+z=1$, and $x=0.4$–$0.97$, preferably $0.60$–$0.85$; $y=0.03$–$0.60$, preferably $0.15$–$0.40$; $z=0$–$0.10$, preferably $0$–$0.3$; and y is $\geq z$, which is treated with $1.0$–$9.0\%$ of a basic magnesium compound which is $MgCO_3$, $Mg(OH)_2$, MgO or mixtures thereof is disclosed. The salt is prepared by neutralizing Caro's acid with a basic potassium compound to form a reaction mixture. Water is evaporated from the reaction mixture at 15° to 35° C. using a vacuum of 2–15 mm Hg absolute pressure to form up to 40 wt. % crystals. The crystals are separated, treated with a basic magnesium compound, dried, and further treated with a basic magnesium compound.

18 Claims, No Drawings

POTASSIUM MONOPERSULFATE COMPOSITIONS AND PROCESS FOR PREPARING THEM

This application is a continuation of application Ser. No. 567,007, filed Dec. 30, 1983, now abandoned.

BACKGROUND OF THE INVENTION

1. Field of the Invention

The present invention relates to a process for preparing a mixture of potassium monopersulfate, potassium bisulfate, and optionally, potassium sulfate by partial neutralization of Caro's acid ($H_2SO_5$) with a basic potassium compound and crystallization.

2. Prior Art

U.S. Pat. No. 2,901,319 discloses reacting a mixture of $H_2SO_5$:$H_2SO_4$ in a mole ratio of 2 to 10:1 with $K_2CO_3$, $KHCO_3$ or KOH using a mole ratio K+:$H_2SO_5$ of from 0.6–1.2 at a temperature of from $-10°$ to $40°$ C. The product is washed with ethanol and dried using a vacuum.

U.S. Pat. No. 3,036,885 discloses reacting hydrogen peroxide, potassium peroxydisulfate and fuming sulfuric acid cooling the reaction mixture, bringing the pH to 1–2 with an alkali and evaporating moisture from the resulting salts until they are dry.

U.S. Pat. No. 3,041,139 discloses neutralizing a mixture of $H_2SO_5$ and $H_2SO_4$ with a basic potassium compound to form an aqueous solution which on drying will contain the triple salt $KHSO_4 \cdot K_2SO_4 \cdot 2KHSO_5$.

British Pat. No. 979,450 discloses reacting hydrogen peroxide with concentrated sulfuric acid or oleum to form a monopersulfuric acid solution, adding potassium bisulfate or potassium sulfate to the monopersulfuric acid solution, neutralizing the resulting solution with a solution of a basic potassium compound and air drying the neutralized solution.

Canadian Pat. No. 575,441 discloses treating dried potassium monopersulfate containing mixtures with magnesium carbonate.

SUMMARY OF THE INVENTION

The present invention relates to a process for producing a stable mixture of potassium monopersulfate, potassium bisulfate, and optionally potassium sulfate having an active oxygen (a.o.) content of from 4.2 to 10.2 percent by weight and preferably from 6.3 to 8.9 percent by weight. The process involves neutralizing the Caro's acid, which may be diluted prior to neutralization, with a basic potassium compound (with respect to the acid) while maintaining the ratio of K+:S in the neutralization reaction mixture at from 0.4 to 1 and preferably from 0.6:1 to 0.95:1 and while maintaining the slurry concentration in the reaction mixture between 3 and 40 weight %, preferably 20–35 weight %. Water is removed from the reaction mixture at a temperature of $15°$ to $35°$ and preferably $20°$ to $30°$. In a preferred aspect of the invention water is removed by evaporation using a pressure of 2 to 15 mm Hg absolute. The solids which form are separated from the reaction mixture and the mother liquor may be recycled to the evaporater. Preferably the separated solids are treated with a basic magnesium compound, further dried, and treated with additional basic magnesium compound.

DETAILED DESCRIPTION

The product of the present invention is a storage stable salt having the formula $(KHSO_5)_x(KHSO_4)_y(K_2SO_4)_z$ where $x+y+z=1$, and $x=0.4–0.97$, preferably 0.60–0.85; $y=0.03–0.60$, preferably 0.15–0.40; $z=0–0.10$, preferably 0–0.03; and y is $\geq z$. Preferably the product is treated with 1.0–9.0% of a basic magnesium compound which is $MgCO_3$, $Mg(OH)_2$, MgO or mixtures thereof. Magnesium carbonate is the preferred basic magnesium compound. By magnesium carbonate is meant the chemical $MgCO_3$ as well as any of the other forms, such as $MgCO_3 \cdot Mg(OH)_2$, $3MgCO_3 \cdot Mg(OH)_2$, $4MgCO_3 \cdot MgO$, $4MgCO_3 \cdot Mg(OH)_2$. The commercially available magnesium carbonates may further contain several molecules of bound water of crystallization. For example, magnesium carbonate sold by Merck Company under the trade name Magcarb ® L is reported to have an approximate formula $(MgCO_3)_4Mg(OH)_2 \cdot 5H_2O$.

The first step in the process of the present invention involves reacting Caro's acid with a basic potassium compound. Preferably Caro's acid is prepared by reacting oleum containing 60 to 70% by weight $SO_3$ with aqueous hydrogen peroxide containing 65 to 75% by weight hydrogen peroxide. The reaction is carried out at $5°$ to $25°$ C. and preferably $5°$ to $15°$ C. The molar ratio of sulfur to peroxide is from 0.9:1 to 1.2:1. Below the 0.9:1 ratio, the $H_2O_2$ conversion is poor. Above the 1.2:1 ratio the $H_2O_2$ conversion is high, but the $H_2SO_5$ content declines rapidly while the $H_2SO_4$ content increases; also, $H_2S_2O_8$ begins to form and constitutes an undesirable impurity item in the composition. The resulting especially preferred composition contains 62 to 76 wt. % $H_2SO_5$; 12 to 22 wt. % $H_2SO_4$; 3 to 7 wt. % $H_2O_2$ and the remainder water. The mole ratio of $H_2SO_5$:$H_2SO_4$ suitable for use in the present invention is from 1:1 to 15:1 with 2.5:1 to 5.5:1 being preferred. Preferably the oleum is added to a well-stirred aqueous solution of the hydrogen peroxide over a period of ½ to 2 hours. It is preferred that after oleum addition the mixture be stirred for an additional ½ to 2 hours to complete the reaction. The Caro's acid may be used as such or it may be diluted before reaction with the K-base. If diluted, it is preferred the concentration be no more than 40% by weight. Dilute Caro's acid is more stable and its use results in less decomposition of the $HSO_5^-$ values during partial neutralization of the acid with the base.

The $H_2SO_5$/$H_2SO_4$ mixture is then neutralized with a basic potassium compound, preferably used as an aqueous solution thereof. The preferred basic potassium compounds are potassium hydroxide, potassium bicarbonate and potassium carbonate. The temperature is kept below $35°$ C. to avoid loss of active oxygen. The K+:S molar ratio of the neutralized acids in the reaction mixture should be in the range of 0.40:1 to 1.0:1 and preferably from 0.60 to 0.95. When the ratio is below 0.40, crystallization (in the next step) is extremely slow and difficult because of the excess acidity of the system. Also, the products crystallizing out of such a highly acidic liquor are more acidic due to mother liquor occlusion and are hygroscopic. On the other hand, when the K+:S molar ratio of the reaction mixture is above 1, $K_2SO_4$ appears in the product, and the product tends to be hygroscopic and gummy.

Because K+:S mole ratio in the product is about 1:1 the net "K+" feed in a continuous process should be equimolar with the net "S" feed. However, it is very important that the product be crystallized from a K+ deficient reaction mixture at a K+:S molar ratio of from 0.40:1 to 1.0:1 and preferably 0.60:1 to 0.95:1. It will be noted that even when operating with a K+:S ratio in the low end of the 0.4 to 1 range, the product that can be separated from the reaction mixture will have the desired K:S ratio of about 1:1. However, in continuous operation it will be necessary to provide a feed having higher K+:S ratio than the mother liquor from which the product has been separated. Towards the end of the reaction the ratio in the feed may be 1:1 or higher provided the ratio in the resulting reaction mixture is less than 1, e.g., 0.95 or less. The partial neutralization can be carried out in any convenient manner, but the basic potassium solution should be added to the acid and the pH of the partially neutralized acid should be maintained below about 2. The pH of the "neutralized" acid generally is below 1. A pH above 2 indicates that there are excess potassium ions in the system which results in decomposition of the $HSO_5^-$ ions and causes the product to have a high potassium sulfate content and an undesirably low potassium monopersulfate content. Generally an aqueous solution containing 5 to 50 wt. % basic potassium compounds is used to neutralize the acid. Suitable potassium compounds include KOH, $K_2CO_3$, $KHCO_3$ and $K_2SO_4$. It is important to avoid having localized regions of high pH. A convenient way of adding the potassium compound to the acid is by trickling a very fine stream of droplets into the vortex of a vigorously agitated acid solution while cooling is applied simultaneously. This can also be done using spargers which inject the potassium compound into the recycling reaction mixture to which the acid is fed at a suitable location.

Removal of water may be done by evaporative methods. The evaporative crystallization of the neutralized solution can be done conveniently in any vacuum evaporation equipment under the prescribed temperature and pressure conditions. The evaporative crystallization and neutralization can be done simultaneously in a vigorously stirred vacuum reactor or vessel in which the acid and the base feeds are mixed in an optimum manner while water is continuously evaporated at the prescribed temperature and the slurry of crystals in the mother liquor is continuously withdrawn to a filtration or centrifugation equipment to harvest the solid crystals while returning the mother liquor back to the evaporative crystallizer equipment. Another modification of this equipment is to mix the acid and the base in a separate pipeline reactor or a pump at the prescribed temperature where the neutralization is efficiently conducted, carrying this neutralized stream to the vacuum evaporator-crystallizer in which water is continuously evaporated while the crystallized solid is continuously withdrawn from a centrifuge and the mother liquor continuously returned to the evaporator crystallizer. In still other embodiments, the acid and base stream are fed directly into an aqueous liquid in the neutralizer-crystallizer whereby dilution and neutralization take place substantially simultaneously. The aqueous liquid can be water as when starting up the process or it can be recycled reaction mixture or mother liquor. Various modifications of this principle can be applied to efficiently combine neutralization, crystallization, and slurry withdrawal in one piece of equipment while maintaining high yields of neutralization and high efficiencies of crystallization.

The evaporative crystallization of the solid is conducted using reaction mixture temperatures of no more than about 35° C., preferably 30, and no less than about 15° C., preferably 20° C. If the evaporative crystallization is done at temperatures significantly below about 15° C., monopersulfate preferentially precipitates out, thus depleting the monopersulfate values from the reaction mixture, and eventually making the reaction mixture rich in sulfate values. Under these conditions, monopersulfate products of higher than anticipated steady state active oxygen content crystallize out in the crystallizer equipment. On the other hand if the evaporative crystallizer temperature is significantly above about 35° C., the crystals contain less monopersulfate and more sulfate values than expected. Under these conditions, the monopersulfate content of the mother liquor will continue to increase while the sulfate content will continue to decrease. Also at temperatures of about 35° and above the decomposition rate in the partial neutralization as well as the evaporative crystallization increases significantly with the loss of monopersulfate values and the increase sulfate values as a result of the decomposition of $HSO_5^-$ ions Thus $HSO_5^-$ acts as a rather expensive feed for $HSO_4^-$ formation in the system. Thus, at the higher temperatures the products of crystallization usually contain lower than the desired amounts of monopersulfate. As mentioned before, high $H_2SO_5:H_2SO_4$ ratios as well as low decomposition losses of $H_2SO_5$ values are critical to the successful, economical and a continuous commercial operation of this process.

The hold time between neutralization and formation of crystals preferably is less than about 20 hours to minimize loss of active oxygen.

Typical steady state analyses of mother liquor and a centrifuge cake before drying are reported in Table I.

TABLE I

|  | Mother Liquor wt % | Centrifuge Cake wt % |
|---|---|---|
| $HSO_5^-$ active oxygen | 5.5–6.5 | 7.3–7.8 |
| $H_2O_2$ | 1.5–2.5 | 0.5–1.5 |
| $H_2SO_5$ | 15–20 | 1–6 |
| $H_2SO_4$ | 0 | 0 |
| $H_2S_2O_8$ | 0 | 0 |
| $KHSO_5$ | 30–40 | 70–75 |
| $KHSO_4$ | 18–23 | 20–27 |
| $K_2SO_4$ | 0–1 | 0–2 |
| $K_2S_2O_8$ | 0 | 0 |
| $H_2O$ (by difference) | 20–30 | 5–10 |

The steady state concentrations such as reported in Table I of the mother liquor determine the type of solid that crystallizes out from that mother liquor. Thus, if the solid crystallizing out of the mother liquor is to contain a very high percentage of monopersulfate, the mother liquor must contain a relatively high amount of the monopersulfate values. Thus, the steady state concentrations of the mother liquor components and the centrifuge cake components are related to each other. There is no fixed steady state concentration of the various components in the mother liquor because these concentrations depend on the starting $H_2SO_5:H_2SO_4$ ratios. If the $H_2SO_5:H_2SO_4$ ratio is 2.5–5.5:1, the steady state concentrations reported in Table I can be expected. In cases where the $H_2SO_5:H_2SO_4$ ratio is significantly higher, for example 5–7.1:1 as can be obtained from a reaction of $SO_3$ and 85–90% $H_2O_2$, then the mother liquor and centrifuge cake components will contain significantly higher amounts of the monopersulfate values and relatively lower amounts of the bisulfate and sulfate values for a given $K^+$:sulfur mole ratio in the mother liquor as well as in the centrifuge cake as defined in the invention.

In the crystallizer itself, there is another factor which is very critical to the formation of stable crystals. Preferred crystals are crystals which can be filtered or centrifuged efficiently and have a melting point of 60°–110° C. Undesirable crystals are products which are crystallized in the form of relatively low melting solids (m.pt. 30°–60° C.).

It has been determined that the melting point of the crystals and the nature of the crystals themselves depends on the concentration of crystals in the slurry. The concentration of the crystals in the slurry, sometimes also referred to as slurry concentration, is defined as the weight of crystals remaining after centrifugation in a laboratory centrifuge for about three minutes at 6400 rpm (2900 G's) divided by the total weight of the slurry (crystals plus mother liquor) fed to the centrifuge. The quotient of this division multiplied by 100 gives the weight percent slurry concentration. It has been found that if the concentration of crystals in the slurry is significantly above about 40 wt. % of the total slurry weight then mother liquor from the slurry in the crystallizer begins to include in the crystals with the result that when these crystals are dried by heating the crystals begin to dissolve in the included mother liquor. The melting point of such crystals is also low (approx. 30°–60° C.). Included mother liquor is the mother liquor which is trapped inside a crystal in an encapsulated or "included" form. Included mother liquor is to be distinguished from the occluded mother liquor which is trapped between individual crystals. When such crystals are centrifuged, even at very high speeds of up to 6,400 rpm, the mother liquor contained inside a given crystal does not spin out. When the slurry concentration is below about 40 wt. %, "solid" crystals are formed without pockets of the mother liquor, which crystals melt at 60°–110° C. The crystals which contain included mother liquor, upon drying, contain pockets or hollow voids. Thus the preferred crystals can readily be identified by their cross sections. Another benefit of having crystals which have no encapsulated mother liquor is that they do not carry with them the mother liquor which (1) is more acidic than the crystals themselves and (2) brings along with it the impurities contained therein. Thus, the crystals which have included mother liquor generally show higher acidity, that is $K^+$:S ratio of <1. Crystals which have very little included mother liquor or no included mother liquor and which are solid throughout its structure, have the $K^+$:S ratio of about 1.0. The efficiency of solids separation will determine the amount of occluded mother liquor in the crystals. Thus, if the filtration is done on a vacuum filter or a ~1000 G centrifuge, some mother liquor will remain on the crystals. If, however, the centrifugating is done to generate approximately 2900 G's, then most of the occluded mother liquor gets removed from the wet cake. In the present case the crystals were centrifuged in a laboratory 5-inch diameter basket centrifuge for about 3 minutes at 6400 rpm. It has been further determined that when the "solid" crystals are stabilized. with a basic magnesium compound and finally dried, as described below, they tend to remain more stable in storage than the crystals which had the mother liquor originally included inside the crystal structure. This is because the mother liquor which was included with the relatively less stable crystals remains there without any contact with the stabilizer because the stabilizer essentially contacts the surface of the crystals. The mother liquor eventually dries in the crystal leaving cavities within the crystal. Such crystals are not truly stabilized. Thus, it is highly desirable to form crystals which are substantially free of cavities, i.e., "solid," throughout their internal structure and which have a minimal inclusion of mother liquor. Storage stable product can be made under these circumstances.

The intercrystal occlusion of the mother liquor; i.e., the mother liquor trapped between crystals is a function of the crystallization rates, crystal size and the filtration or centrifugation efficiency. This intercrystal mother liquor occlusion can be alleviated by growing larger crystals by conventional crystal ripening or crystal growing techniques and by having efficient mother liquor separation equipment.

The crystals which have intracrystal inclusion of mother liquor generally also have intercrystal occlusion and are finer in size. The mother liquor inclusion and occlusion phenomena are the result of the crystallization technique; i.e., how fast the crystallization is done, how supersaturated the crystallizing liquor is and how high the slurry concentration is. The more desirable cavity-free crystals generally crystallize in larger and more uniform size and are separated from the mother liquor more readily. In summary, in order to make the desired cavity-free crystals with this process it is essential that the slurry concentration be kept between about 3–40% and preferably 20–35%. Any slurry concentration below about 20%, and particularly below 3%, while operable, may not be economically desirable.

The crystallization is done under sufficiently reduced pressure to distill water at 15°–35° C. at a reasonable rate. Temperatures below 35° C. are used to minimize the active oxygen losses. It has been found that the evaporation of the above mentioned crystallizer liquor takes place very efficiently at less than about 15 mm of Hg absolute pressure. The evaporative crystallization is particularly efficient below about 12 mm Hg and most efficient below about 9 mm Hg because the crystallization can be carried out at the preferred temperature of about 20°–30° C. while evaporating the water at a relatively fast rate.

The preferred crystals after separation from the mother liquor but prior to treatment with basic magnesium compound and drying contain from 3 to 8 wt. % water and a trace, up to 1%, hydrogen peroxide.

The vacuum evaporation can be done by any conventional techniques including the use of mechanical pumps or steam ejector jets.

The centrifuge cake is blended with from 0.5–5 wt. %, and preferably 1–3 wt. %, basic magnesium compound to further stabilize the product. Dusting can occur when more than about 5 wt. % basic magnesium compound is used. This neutralizes excess surface $H_2SO_5$ present, and absorbs water by forming a hydrate which makes the product free flowing and elevates the melting point of the crystals from 60° to 110° up to 80° to 150° C. The basic magnesium compound exhibits the unique property of both neutralizing the acid without decomposition of $HSO_5^-$ values and raising the melting point of the crystals. The elevated melting point makes the product more stable in the drying step. Generally it takes about 10 minutes mixing of the product with the basic magnesium compound for the melting point increase of the product to occur. Following blending with basic magnesium compound the product is dried at 50° to 100° C., preferably 50° to 85° C. and most preferably 60° to 80° C., until the moisture content is less than about 4 wt. %. In any event, the drying temperature should be below the temperature where the crystals begin to stick together or to the surface of the drying equipment. The product is then blended with an additional minimum of 0.5% and preferably 1–4 wt. % basic magnesium compound to bring the total basic magnesium compound added to the product to from 1 to 9 wt. %. The moisture is believed to be present as a stable hydrate. This serves to lend moisture resisting and free flowing characteristics to the product.

EXAMPLES

In the Examples, all percentages are by weight.

EXAMPLE 1

Preparation of $H_2SO_5:H_2SO_4$ Mixture

To 300 gm of 70% $H_2O_2$ (6.18 moles, 100% basis) contained in a 1 L, 4 neck glass round-bottom flask having a stirrer, a thermometer, an oleum dropping funnel and a vent with a 'Drierite' drying tube, were added dropwise 285 ml (567.7 gm, 6.64 moles) of 65% oleum. The stirring was brisk (approx. 700 rpm) and the reaction temperature was maintained at 5°–15° C. by means of a dry ice/methylene chloride bath. The oleum addition was done over about an hour. The reaction mixture was stirred for an additional ¾ hour after the oleum addition. The mixture was then analyzed. The analyses were: $H_2SO_5 = 68.48\%$; $H_2SO_4 = 18.15\%$; $H_2O_2 = 3.3\%$.

The mole ratio of $H_2SO_5:H_2SO_4$ was 3.24.

The yield of $H_2O_2$ in the reaction was 98.0% and the conversion of $H_2O_2$ to $H_2SO_5$ was 84.4%.

EXAMPLE 2

Dilution of High Strength $H_2SO_5$ With Water

A reaction mixture resulting from the addition of 95 ml 65% oleum (189.2 gm, 2.21 moles) to 100 gm of 70% $H_2O_2$ (2.06 moles) and made according to the conditions described in example 1, was diluted in 358 gm of ~15°–20° C. water. The dilution was done under conditions of vigorous stirring in a flask and slow addition of the concentrated $H_2SO_5$ to the cold water. The diluted acid mixture analysed as follows: $H_2SO_5 = 30.8\%$; $H_2SO_4 = 8.83\%$; $H_2O_2 = 1.6\%$.

The $H_2SO_5:H_2SO_4$ mole ratio was 3.0.

The active oxygen yield was 99.8% and the $H_2O_2$ to $H_2SO_5$ conversion was 85%.

EXAMPLE 3

Neutralization of $H_2SO_5/H_2SO_4$ Mixture 700 gm of $H_2SO_5/H_2SO_4$ aqueous mixture containing 32.56% $H_2SO_5$, 1.68% $H_2O_2$ and 8.36% $H_2SO_4$ was neutralized with 277.4 gm of 44.7% KOH solution. The mole ratio of $H_2SO_5:H_2SO_4$ in the acid was 3.34. The $K^+$:total sulfur ratio was calculated to be 0.85. The neutralization was done in a 1 liter round-bottom flask at 20°–25° C. by a dropwise addition of the KOH to a vigorously stirred acid mixture. After the addition of the KOH, the partially neutralized acid was analysed for $HSO_5^-$ values. The $HSO_5^-$, expressed as $H_2SO_5$ of the neutralized solution was found to be 22.25%. The $H_2SO_5$ yield in the neutralization of the acid mixture was found to be 95.4%.

EXAMPLE 4

This examples describes the monopersulfate compound preparation from $H_2SO_5$.

(A) Preparation of $H_2SO_5$ 200 gm (4.12 moles, 100% basis) of 70% $H_2O_2$ were reacted with 380 gm (4.44 moles) of 65% oleum according to the conditions described in Example 1. The sulfur:$H_2O_2$ mole ratio was 1.08:1. The concentrated $H_2SO_5$ was then diluted with 735 gm of deionized water according to the conditions described in Example 2. The diluted $H_2SO_5$ was analyzed and showed 30.36% $H_2SO_5$, 7.51% $H_2SO_4$, 1,80% $H_2O_2$ and the balance being $H_2O$. The $H_2SO_5:H_2SO_4$ mole ratio was 3.48:1. The yield of active oxygen was 94.4% and the $H_2O_2$ conversion to $H_2SO_5$ was 85.0%.

(B) Neutralization of dil. $H_2SO_5$ 600 gm of the 30.36% $H_2SO_5$ described in (A) was neutralized according to the conditions described in Example 3 with 219.86 gm of 44.7% KOH. 25 ml water was used to rinse the KOH addition funnel into the reaction mixture. The $K^+$:S mole ratio of the reaction mixture was analyzed as 0.87. The monopersulfate yield was 99.7%.

(C) Formation and Recovery of Monopersulfate Crystals

Approximately 844.9 gm of the homogeneous neutralized solution described in (B) was vacuum evaporated in a 500 ml jacketed flask with an efficient stirrer and a thermometer. The jacket had warm water circulation to maintain any desired temperature between 15° and 35° C. Initially 300 ml of the partially neutralized $H_2SO_5$ was added to the flask and vacuum evaporated under 7–10 mm Hg pressure (absolute) until crystals appeared in the flask. A continuous addition of the partially neutralized $H_2SO_5$ was started at such a rate that the water was continously evaporated and the crystals in the flask were neither allowed to dissolve nor build to a thick slurry. The temperature of the contents of the crystallization flask was maintained at 20°–25° C. by proper adjustment of the jacket water temperature. After all the partially neutralized $H_2SO_5$ was added, over about 4 hours, the mixture, containing product crystals was stirred for an additional hour. After releasing vacuum, the slurry at ~25° C. was centrifuged at 6400 rpm for 3 minutes in a 5-inch diameter basket laboratory centrifuge.

The centrifuge cake (the 'wet cake') weighed 82.11 gm and contained 7.57% active oxygen, 0.57% $H_2O_2$, 21.8% $KHSO_4$, 67.58% $KHSO_5$, 3.33% $H_2SO_5$ and 6.71% $H_2O$. The water and $H_2SO_5$ were the result of the natural mother liquor dragout by the crystals. The $K^+$:S mole ratio of this wet cake was 0.95:1. The melting point was 70°–75° C. The crystals were clusters of logs which appeared 'dry.' Photomicrographs of representative crystals showed them to be solid, without visible 'inclusion' cavities.

The mother liquor from the crystallizer weighed 182.0 gm and contained 50.01% $KHSO_5$, 21.91% $KHSO_4$, 1.72% $H_2O_2$, 6.55% free $H_2SO_5$, 19.81% $H_2O$.

The concentration of the crystals in the slurry was 31.3%.

The monopersulfate recovery in the total crystallizer contents, basis the neutralized H₂SO₅ feed was calculated to be 68.3% of theory.

(D) Stabilization of the Product 80 gm of the wet cake produced in (C) above was blended with 3% by weight (2.4 gm) of magnesium carbonate for ~15 minutes and was dried in a 1 L rotating stainless steel baffled beaker for 45 minutes at 65° C. The drying was done by hot ambient air from a hot air gun. After drying, the product was cooled, blended with additional 3% magnesium carbonate and stored. The melting point of this product was 120°–128° C. The analysis showed 7.34% active oxygen content equivalent to 69.8% KHSO₅, 0.14% H₂O₂ and 4.0% H₂O. There was no free H₂SO₅ acidity. The monopersulfate yield based on the active oxygen content before and after drying and MgCO₃ addition was 100%.

The product thus obtained was stable in ambient storage. The relative oxygen loss was 8.85% in 9⅓ months. This represents <1% relative active oxygen loss per month.

EXAMPLE 5

Melting Point Elevation by Treatment of Wet Cake with a basic Magnesium Compound For this study, small (10–15 gm) samples of monopersulfate compositions of about 7–8% active oxygen content, made by the batch procedure described in Examples 1–4, were mixed with MgCO₃ and blended for various lengths of time in wide mouth glass jars attached to a Fisher-Kendall rotating mixer. (This mixer has a 1725 rpm enclosed motor geared down to 57 rpm, for rotating two extending arms with U-shaped holders. While mixing, the contents slide inside the container back and forth and rolled over and over.)

Table II gives the results of these experiments with 2, 3, and 4% MgCO₃ addition to the centrifuge cake of the monopersulfate compositions.

As can be seen, under laboratory mixing conditions described above, a blending time of about 30 minutes elevated the product melting point to a peak, before hot air drying.

TABLE II

| MgCO₃ Addition % by wt. | °C. Melting Points (Original 40–70° C.) | | | | | |
|---|---|---|---|---|---|---|
| | Before Drying | | | | | After Drying 65° C./ 30 Min. |
| | Time in Minutes | | | | | |
| | 15 | 30 | 45 | 60 | 18 hrs | |
| 2 | 56–84 | 80–85 | 80–83 | 75–80 | 80–85 | 82–86 |
| 3 | 71–85 | 74–80 | 77–90 | 77–90 | 79–89 | 81–86 |
| 4 | 79–95 | 83–101 | — | 82–101 | 82–100 | 85–92 |

After further treatment of the dried product with magnesium carbonate to bring the total magnesium carbonate level to 6% the melting points were raised to 128°–146° C., 120°–123° C. and 100°–115° C. respectively.

EXAMPLE 6

A 73 hour semi-continuous laboratory experiment was conducted by continuously feeding partially neutralized H₂SO₅ made as in Example 4 (A) and (B) to the crystallizer flask described in Example 4 (C) and continuously crystallizing the product in the crystallizer. The crystals were removed about every two to four hours, at which time the vacuum (about 6–12 mm) was released, the slurry filtered and the mother liquor returned to the flask. The vacuum crystallization was restarted after the return of the solid-free mother liquor, more neutralized H₂SO₅ added continuously and more crystals formed. The crystallizer temperature was maintained at 20°–25° C.; however, there were some inadvertent excursions of temperature to 40° C. The results given in Table III show the mother liquor quality in equilibrium the centrifuge cake separated from the mother liquor. Generally 7.2 to 8.2% active oxygen containing products were made from mother liquor which had a K⁺:S ratio of 0.44 to 0.90. The amount of crystals in the crystallizer slurry varied from 0 to 37 wt. % during the experiment, with four excursions above 40 wt. %.

TABLE III

| Hours From Start | Mother Liquor | | | Solid Centrifuged Wet Cake | | | | |
|---|---|---|---|---|---|---|---|---|
| | K⁺:S Mole | % H₂O₂ | % H₂O | K⁺:S Mole | % A.O. | % H₂O | % Free H₂SO₅ | % H₂O₂ |
| 1.4 | 0.67 | 2.04 | 24.54 | 0.84 | 8.09 | 13.08 | 11.21 | 0.93 |
| 3.1 | 0.72 | 1.82 | 28.03 | 0.94 | 7.82 | 10.15 | 4.14 | 0.33 |
| 6.0 | 0.69 | 2.15 | 29.22 | 0.94 | 8.20 | 7.72 | 4.61 | 0.15 |
| 8.1 | 0.67 | 2.09 | 31.51 | 0.93 | 7.77 | 9.56 | 4.72 | 0.32 |
| 11.6 | 0.71 | 2.08 | 29.92 | 0.94 | 7.79 | 7.97 | 4.19 | 0.14 |
| 14.1 | 0.79 | 2.12 | 25.39 | 0.98 | 7.66 | 2.67 | 1.73 | 0.48 |
| 15.3 | 0.73 | 2.62 | 27.32 | 0.93 | 7.32 | 9.66 | 4.89 | 0.63 |
| 18.8 | 0.80 | 1.82 | 24.45 | 0.97 | 7.12 | 8.91 | 2.46 | 0.66 |
| 20.6 | 0.81 | 2.74 | 19.69 | 0.86 | 7.81 | 7.57 | 10.23 | 1.24 |
| 23.6 | 0.90 | 1.89 | 17.28 | 0.92 | 6.99 | 8.36 | 6.02 | 1.71 |
| 26.1 | 0.76 | 2.46 | 23.74 | 1.03 | 6.44 | 10.10 | 0 | 1.68* |
| 29.1 | 0.66 | 2.66 | 26.61 | 0.93 | 7.29 | 8.75 | 4.77 | 0.62 |
| 32.8 | 0.66 | 2.15 | 28.51 | 0.99 | 7.59 | 5.63 | 0.97 | 0.48 |
| 35.4 | 0.61 | 2.16 | 29.82 | 0.95 | 7.49 | 7.93 | 3.62 | 0.42 |
| 37.5 | 0.79 | 2.06 | 27.07 | 1.09 | 7.41 | 5.07 | 0 | 0.41** |
| 38.6 | 0.63 | 2.02 | 31.71 | 0.99 | 7.7 | 5.17 | 0.93 | 0.21 |
| 41.4 | 0.44 | 2.58 | 25.63 | 0.97 | 7.3 | 7.72 | 2.17 | 0.49 |
| 44.6 | 0.44 | 2.62 | 27.00 | 0.87 | 7.91 | 6.00 | 9.87 | 0.49 |
| 46.3 | 0.49 | 2.90 | 22.69 | 0.93 | 5.20 | 6.77 | 5.22 | 0.53 |
| 48.6 | 0.47 | 2.92 | 18.58 | 0.86 | 7.52 | 8.97 | 10.10 | 0.83 |
| 53.2 | 0.46 | 3.23 | 29.87 | 0.91 | 7.22 | 5.86 | 6.60 | 0.28 |
| 58.6 | 0.46 | 3.08 | 28.03 | 0.97 | 6.57 | 4.28 | 2.20 | 0.41 |
| 61.4 | 0.51 | 2.84 | 29.88 | 0.95 | 7.25 | 6.91 | 3.86 | 0.55 |
| 62.8 | 0.53 | 3.03 | 30.84 | 0.96 | 7.16 | 6.74 | 3.07 | 0.42 |
| 63.0 | 0.50 | 3.43 | 29.01 | 1.0 | 7.22 | 5.01 | 0 | 0.36 |
| 65.8 | 0.52 | 2.93 | 23.64 | 0.86 | 6.87 | 9.62 | 9.81 | 0.54 |
| 67.2 | 0.46 | 2.66 | 31.97 | 0.98 | 7.11 | 7.39 | 1.27 | 1.05 |

TABLE III-continued

| Hours From Start | Mother Liquor | | | Solid Centrifuged Wet Cake | | | | |
|---|---|---|---|---|---|---|---|---|
| | $K^+$:S Mole | % $H_2O_2$ | % $H_2O$ | $K^+$:S Mole | % A.O. | % $H_2O$ | % Free $H_2SO_5$ | % $H_2O_2$ |
| 69.5 | 0.44 | 2.65 | 30.99 | 0.92 | 7.44 | 9.44 | 5.74 | 0.88 |
| 73.0 | 0.49 | 3.49 | 21.63 | 0.90 | 7.32 | 8.12 | 7.09 | 0.73 |

*$K_2SO_4$ = 2.85%
**$K_2SO_4$ = 9.33%

EXAMPLE 7
Stability of Crystals Without Inclusion Cavities

Monopersulfate products made as described herein were stored at ambient temperatures in closed jars and the active oxygen (a.o.) loss measured after a period of over a month. The crystals contained a total of about 6% magnesium carbonate stabilizer. Monopersulfate, which on photomicrographic examination was substantially free of inclusion cavities, was significantly more stable than the product which showed noticeable inclusion cavities. The results are given in Table IV.

TABLE IV

| Crystal Type | Original a.o. | Final a.o. | Days of Storage | % a.o. Loss Per Month |
|---|---|---|---|---|
| Cavity-Free (Example 4 product) | 7.34 | 6.69 | 284 | 0.95 |
| With Inclusion Cavities | 7.35 | 7.10 | 44 | 2.34 |

I claim:

1. A process for producing substantially cavity-free crystals containing $KHSO_5$ comprising partially neutralizing an aqueous mixture of $H_2SO_5$ and $H_2SO_4$ having a ratio of $H_2SO_5$:$H_2SO_4$ of from 1:1 to 7.1:1 with an aqueous solution of a basic potassium compound to form a reaction mixture having a molar ratio of potassium to sulfur of from 0.4:1 to 1:1, maintaining a slurry concentration in the reaction mixture at between 3 and 40 wt. % of substantially cavity-free crystals containing $KHSO_5$, maintaining the slurry at about 15° to 35° C. and separating the reaction mixture into a substantially liquid-free crystalline cake and a mother-liquor stream at about 15° to 35° C.

2. The process of claim 1 wherein the slurry concentration is controlled by evaporating excess liquid at 2-15 mm Hg absolute pressure.

3. The process of claim 2 wherein the reaction mixture has a molar ratio of potassium to sulfur of from 0.60:1 to 0.95:1.

4. The process of claim 3 wherein the acid being neutralized has a molar ratio of $H_2SO_5$:$H_2SO_4$ of from 2.5:1 to 5.5:1.

5. The process of claim 4 wherein the slurry is maintained at 20°-30° C. and the reaction mixture is separated into the crystalline cake and mother liquor stream at 20°-30° C.

6. The process of claim 1 wherein the crystals separated from the slurry but not dried are blended with from 0.5 to 5% by weight based on the weight of said crystals of magnesium carbonate, magnesium hydroxide, magnesium oxide, or mixtures thereof, and then dried at 50° to 100° C.

7. The process of claim 6 wherein the dried crystals are mixed with at least 0.5% by weight of a basic magnesium compound selected from the class consisting of magnesium carbonate, magnesium hydroxide, and/or magnesium oxide.

8. The process of claim 7 wherein the crystals prior to drying are mixed for at least 10 minutes with from 1.0 to 3.0% by weight of the basic magnesium compound.

9. The process of claim 8 wherein the slurry is maintained at 20°-30° C. and the reaction mixture is separated into the crystalline cake and mother liquor stream at 20°-30° C.

10. The process of claim 9 wherein the basic magnesium compound is magnesium carbonate.

11. A process fo stabilizing crystals of a salt having the formula $(KHSO_5)_x(KHSO_4)_y(K_2SO_4)_z$ where $x+y+z=1$ and $x=0.4-0.97$, $y=0.03-0.60$, $z=0-0.10$, and $y \geq z$, said crystals containing 3 to 8% by weight acidic mother liquor from which the crystals are formed comprising directly blending said crystals with from 0.5 to 5% by weight based on the weight of said crystals of magnesium carbonate, magnesium hydroxide, magnesium oxide, or mixtures thereof, and drying the crystals at 50° to 100° C.

12. The process of claim 11 wherein the dried crystals are mixed with at least 0.5% by weight of a basic magnesium compound selected from the class consisting of magnesium carbonate, magnesium hydroxide, and/or magnesium oxide.

13. The process of claim 12 wherein the crystals prior to drying are mixed for at least 10 minutes with from 1.0 to 3.0% by weight of the basic magnesium compound.

14. The process of claim 13 wherein the basic magnesium compound is magnesium carbonate.

15. Storage stable moisture resistant substantially cavity-free crystals having a melting point of 80°-150° C. containing a salt having the formula $(KHSO_5)_x(KHSO_4)_y(K_2SO_4)_z$ where $x+y+z=1$ and $x=0.4-0.97$, $y=0.03-0.60$, $z=0-0.10$, and $y \geq z$, containing 1.0-9.0 wt. % of a basic magnesium compound selected from the class consisting of magnesium carbonate, magnesium hydroxide, magnesium oxide and mixtures thereof wherein from 0.5 to 5 wt. % magnesium compound based on the weight of said crystals is added according to the process of claim 11 and the remaining magnesium compound is added following the drying step.

16. The crystals of claim 15 wherein $x=0.60-0.85$, $y=0.15-0.40$, and $z=0-0.03$.

17. Substantially cavity-free, stable crystals having a melting point of 60° to 110° C. containing a salt of the formula $(KHSO_5)_x(KHSO_4)_y(K_2SO_4)_z$ where $x+y+z=1$ and $x=0.6-0.85$, $y=0.15-0.40$, $z=0-0.03$, and $y \geq z$.

18. Substantially cavity-free, stable crystals having a melting point of 60° to 110° C. containing a salt of the formula $(KHSO_5)_x(KHSO_4)_y(K_2SO_4)_z$ where $x+y+z=1$ and $x=0.6-0.85$, $y=0.15-0.40$, $z=0-0.03$, and $y \geq z$ made by the process of claim 1.

* * * * *